W. R. WOODS & J. F. LANGSTON.
MEAT CUTTER.
APPLICATION FILED MAY 12, 1917.
1,258,517.
Patented Mar. 5, 1918.
2 SHEETS—SHEET 1.
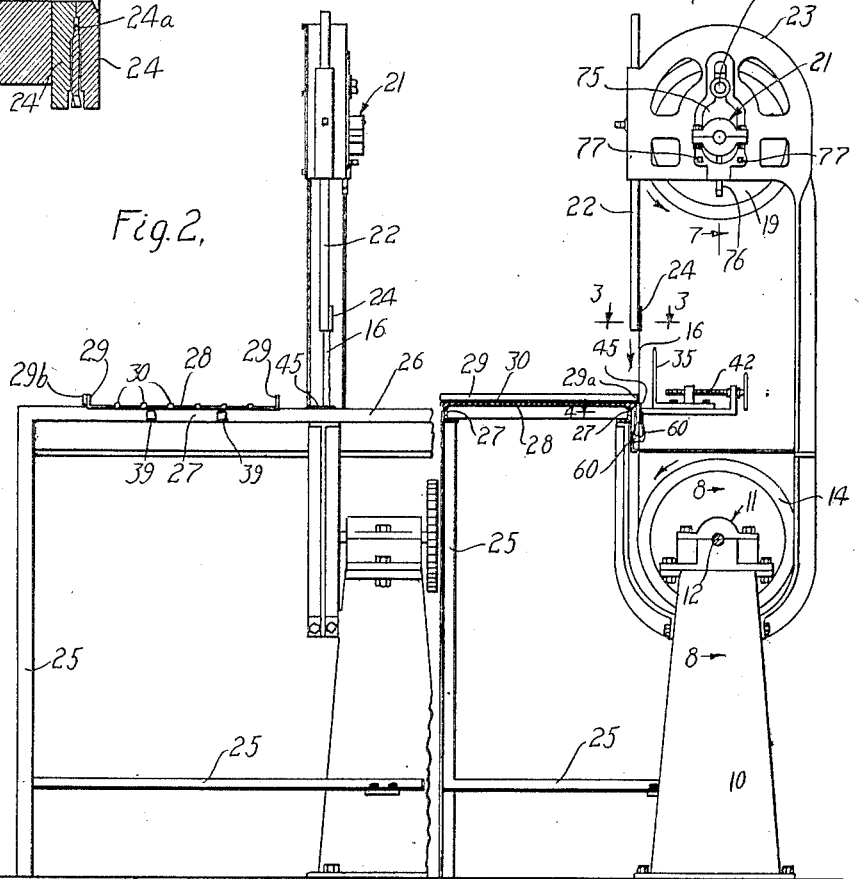
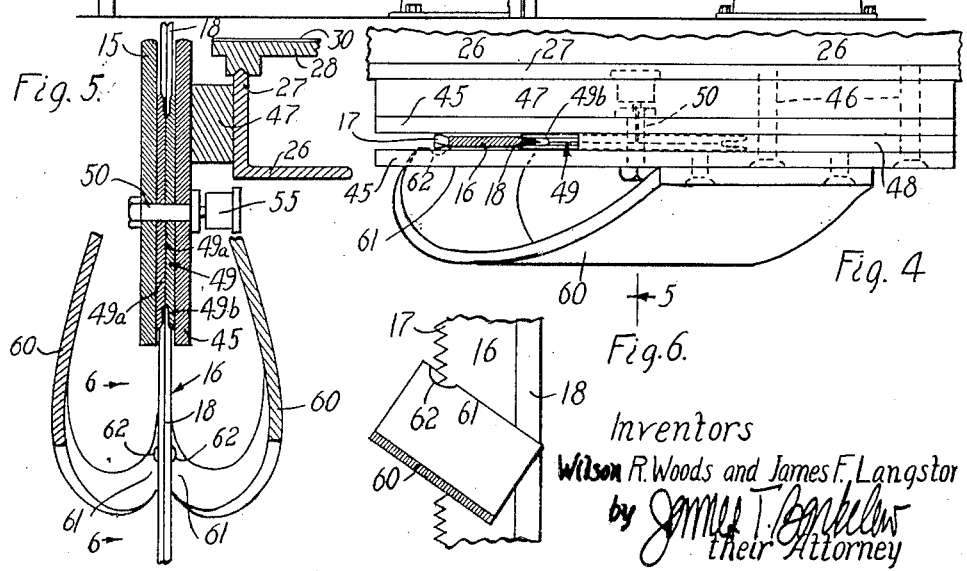
Inventors
Wilson R. Woods and James F. Langston
by *[signature]*
their Attorney W. R. WOODS & J. F. LANGSTON.
MEAT CUTTER.
APPLICATION FILED MAY 12, 1917.
1,258,517.
Patented Mar. 5, 1918.
2 SHEETS—SHEET 2.
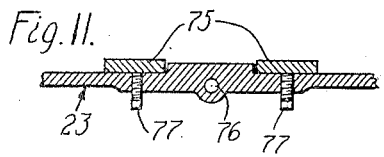
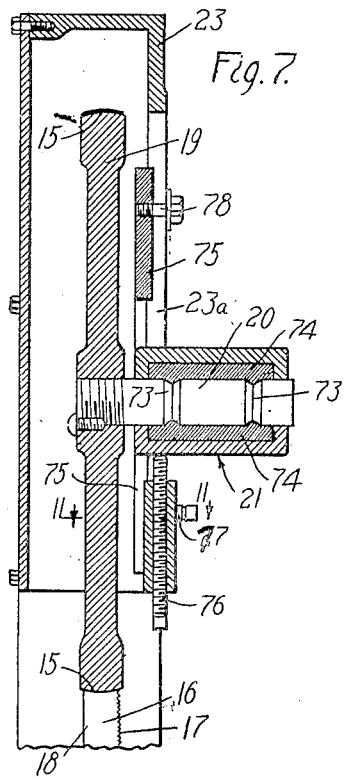
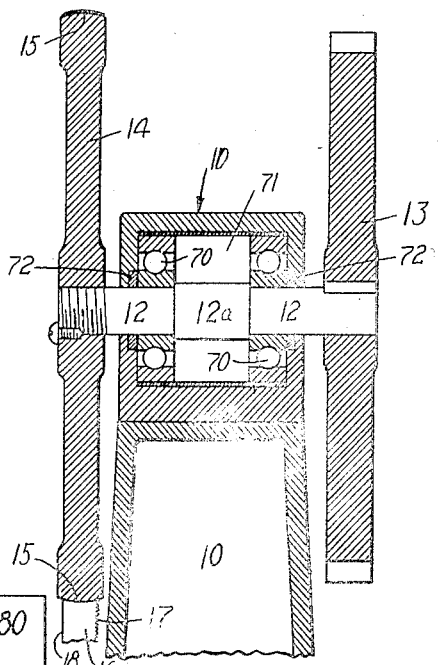
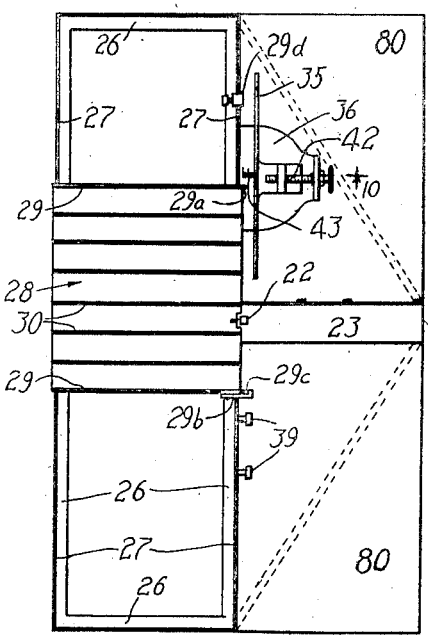
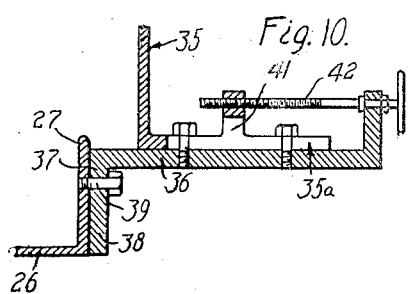
Inventors
Wilson R. Woods and James F. Langston
by James T. Vankelow
their Attorney

UNITED STATES PATENT OFFICE.

WILSON R. WOODS AND JAMES F. LANGSTON, OF LANCASTER, CALIFORNIA.

MEAT-CUTTER.

1,258,517.  Specification of Letters Patent.  Patented Mar. 5, 1918.

Application filed May 12, 1917. Serial No. 168,070.

*To all whom it may concern:*

Be it known that we, WILSON R. WOODS, and JAMES F. LANGSTON, citizens of the United States, residing at Lancaster, in the county of Los Angeles, State of California, have invented new and useful Improvements in Meat-Cutters, of which the following is a specification.

This invention relates to meat cutters of the general type shown in U. S. Letters Patent No. 1,214,739, issued on February 6, 1917, to Wilson R. Woods; and it is a primary and general object of this present invention to provide a machine of improved type and form adapted to efficiently cut meat and the like.

There are many improvements in our present machine, all as will be understood from the following detailed specification. Most of these improvements relate to, or are in connection with, the cutter, which we now make as a single band provided with saw teeth on one edge and a knife edge at the other edge of the band. A reversible movable table is adapted to carry meat against either the saw edge or the knife edge. In order to operate such a band cutter, we have devised means for running it over a pair of crowned pulleys without the use of any flanges or other means for holding the band on the pulleys; and we have provided suitable guides for holding the band in proper position when it is pressed transversely during a cutting action. We have further provided suitable cleaning means for the cutter band; and, generally, we now provide an improved simplified form of meat cutter device which may be economically manufactured and whose use is very simple.

Various other objects of the invention, and corresponding features of improvement, will be understood from the following detailed specification wherein we describe a preferred form of our device, reference being had to the accompanying drawings in which—

Figure 1 is a vertical end view and section of our improved meat cutter; Fig. 2 is a partial side elevation of the same; Fig. 3 is an enlarged section taken as indicated by line 3—3 on Fig. 1; Fig. 4 is a horizontal section taken as indicated by line 4 on Fig. 1; Fig. 5 is a vertical section taken as indicated by line 5 on Fig. 4; Fig. 6 is a detail view taken as indicated by line 6—6 on Fig. 5; Fig. 7 is an enlarged section taken as indicated by line 7—7 on Fig. 1; Fig. 8 is an enlarged section taken as indicated by line 8—8 on Fig. 1; Fig. 9 is a plan of the whole device; Fig. 10 is an enlarged section taken as indicated by line 10 on Fig. 8; and Fig. 11 is an enlarged section taken as indicated by line 11—11 on Fig. 6.

In the drawings we show a pedestal 10 carrying upon its upper end the journal bearing 11. This journal bearing, the details of which will be hereinafter fully described, carries the main driving shaft 12 of the machine, and the driving shaft has thereon a driving gear 13 and the band driving wheel 14. This band driving wheel 14 is shown in enlarged section in Fig. 7. Its periphery is slightly crowned, as shown at 15. In practice, this crown amounts to about one sixty-fourth of an inch. The cutter band 16 is an endless band with saw teeth 17 on one edge and knife edge 18 on the other edge, and travels over the driving wheel 14 and over a similar upper wheel 19 mounted upon a shaft 20 held in an adjustable bearing 21. This bearing, as will be hereinafter described, is adjustable both as to vertical position and as to tilt.

Power is applied through the gear 13 to drive the cutter band at a suitable high speed, moving the cutter band in the direction indicated by the arrows. A guard and guide bar 22 is held in the upper frame work 23 and has on its lower end a pair of blocks 24 between which the cutter band travels. This bar 22 is situated directly in front of the cutter band so as to act as a guard; and the members 24 serve to prevent lateral displacement of the cutter band.

We provide a frame work 25 made up preferably of angle bars and carrying an upper horizontal angle bar frame 26 presenting longitudinal guides 27 to carry a meat table 28. This meat table moves reversibly longitudinally of the frame 26, and its inner edge passes close to the cutter band, as is clearly shown in Fig. 1. This table may have end ledges 29 and transverse ribs 30. These ribs 30 serve to keep the meat from moving or creeping on the table. We have found from experience that it is essential to have some means provided for holding the meat upon the table in order to obtain an unvarying thickness of cut. The clamping means which is usually used in meat cutters is very inconvenient because it must be set and released each time a piece of meat is put into the machine and removed. We find that such ribs, as shown at 30 prevent the meat from moving on the table. and prevent it from creeping away from the cutter band, so that a uniform cut may be easily obtained. It is only necessary for the operator to slightly hold the meat down on the table while moving the meat on the table.

We provide a vertical cut regulating plate 35 slidably and adjustably mounted upon a base plate 36; and this base plate has a downwardly projecting front flange or ledge 37 with slots 38 therein to hook over bolts or screws 39 placed upon the inner angle bar 26. This cut regulating plate is easily removable from the bolts 39 at one side of the upper frame 26, so as to be placed either upon one side or the other, depending upon whether the knife or saw edge of the cutter band is being used. Plate 35 slides upon the base plate 36, being guided thereon in proper motion by any suitable means, as by screws or bolts 40 in a slot 41 in the extension 35$^a$ of the plate 35; and a screw 42 provides means for adjusting the position of the plate 35 to regulate it for different cuts. The face of the base plate 36 may be graduated, as shown at 43, to indicate the thickness of the cut, and to thus facilitate the proper adjustment of plate 35.

Immediately below the surface level of meat table 28 we provide the guide plates 45 between which the cutter band 16 travels. These plates 45 project with their upper edges up to the surface of the table, so that the meat, at the actual point of cutting, is supported upon the upper edges of these plates 45. These plates are secured to the angle bar 26 by any suitable means, as indicated at 46 in Fig. 4 and are spaced therefrom by a spacer block 47, as shown in Figs. 4 and 5, and are spaced apart by a spacer block 48 between them, as shown in Fig. 4. A guide wheel 49 is mounted upon a short shaft 50, between the guide plates 45. This wheel 49 may preferably be made up of two parts 49$^a$, so made and assembled as to form a wheel with a thin circumferential groove or slot, as shown at 49$^b$. This circumferential slot is very narrow, being in practice about five one-thousandths of an inch wide, so that the knife edge 18 of the cutter band may enter part way into this groove and the inclined knife edge shoulders bear against the outer edges of the groove without the sharp knife edge touching the bottom of the groove. The guide blocks 24 are similarly provided with a narrow slot 24$^a$ into which the knife edge enters in the same manner, as indicated in Fig. 3. The wheel 49 revolves freely, means being provided at 55 for efficiently lubricating it; and it forms a guide for the cutter band, which prevents the cutter band from being moved laterally by any excessive pressure upon its saw edge. And the guide wheel, together with the guide blocks 24, and the guide plates 45, prevent the saw from being twisted out of its proper plane. Any moderate pressure upon the cutter band, such as is developed by cutting boneless meat with either edge of the band, will not force the cutter band off the crowned wheels; but a sudden great lateral pressure, caused by sudden forcing of a bone against the saw edge, might have a tendency to displace the band from the crowned wheels, and this tendency is entirely overcome by the provision of the guide wheel 49. No guide is necessary at the other edge of the band, as sufficient pressure is not developed against the knife edge of the band to run it off the crowned wheels.

In order to keep the band clean and to allow it to do its maximum work, and make a clean meat cut, we provide cleaners in the form shown best in Figs. 4 and 5. These cleaners 60 are preferably made of pieces of spring metal, say spring steel, bent into the scroll shape shown, and secured in the guide plates 45. The lower working edges 61 of these cleaners project inwardly and upwardly against the opposite faces of the band; and they extend diagonally across the opposite faces of the band. The pressure is made such as to properly clean the band; and the edges are provided with small notches 62, to pass the saw teeth 17. These cleaners efficiently clean the band without developing any excessive friction.

The slight crown of the wheels 14 and 19 is sufficient to hold the cutter band on the wheels when the band is stressed tightly in position. The resiliency of the steel band is sufficient to allow it to conform somewhat to the crown of the wheels; and it requires a comparatively great lateral pressure on the band to run it off the wheels. The lower wheel 14 is carried on the shaft 12 in the journal bearing 11. This bearing 11 contains two annular ball bearings 70 spaced apart by an enlarged portion 12$^a$ of the shaft, leaving a space between the ball bearings at 71 to hold grease or other lubricant; so that the ball bearings are practically lubricated once for all time. Small felt washers or the like may be placed at 72 to prevent entry of dust to the bearings.

The upper wheel 19 is carried on its shaft 20 in the bearing 21. This shaft 20 may have grooves 73 and the bearing metals 74 may be conformed similarly to the shaft, so that the shaft is thereby held against end motion. Bearing 21 is mounted in a member 75 vertically slidable and adjustable in the upper frame 23. A screw at 76 provides means for forcing the bearing and the wheel upwardly to tighten the band; and screws at 77 provide means for slightly adjusting the plane of rotation of the wheel 19, while a screw at 78 holds the member 75 in place after it has been once set. The member 75 works in a slot 23ª in the frame 23, and is preferably loose in that slot so as to allow the adjustment herein described. Adjustment of the screws 77 will throw the lower end of member 75 out in the direction indicated by the arrow in Fig. 6; to adjust the wheel 19 into a true vertical plane; and then individual adjustment of the screws 77 will throw the wheel around in one direction or the other, so as to adjust its vertical plane of rotation about a vertical axis to be coincident with the vertical plane of rotation of the lower wheel 14.

In order to make clean cuts clear through the meat we provide the table 28 with end ledges 29ª and 29ᵇ at the ends of the ledges 29. The ledge 29ª, at the knife edge end of the table, projects only far enough to pass the cutter band as closely as possible. The ledge 29ᵇ projects out farther and has a notch or slot 29ᶜ in which the saw teeth may run; a stop being provided at 29ᵈ to limit the table movement so that the bottom of this slot 29ᶜ is never run against the teeth. The ledge 29ᵇ may project out past the cutter band a distance equal to the minimum thickness of cut ever made with the saw—in practice, about one-quarter of an inch. Each of the ledges may be made of some material that will not damage the cutter band if it should come into contact. In instance, they may be made of aluminum (the whole table 28 may be of this metal) or they may be of wood, fiber, hard rubber, or any material sufficiently rigid but soft enough to not damage the cutter band edges.

We have described now a preferred form of mechanism embodying our invention; but we do not conceive our invention to be limited to the particular details herein set forth. Our invention is broad in nature and is not limited except as specified in the following claims; and the details of structure may be varied and modified without departing from the invention.

Having described a preferred form of our invention, we claim:

1. In a device of the character described, a cutter band having saw teeth on one edge and a knife blade on the other edge, and means to carry meat or the like against either edge of the band.

2. In a device of the character described, a pair of band carrying wheels, an endless metallic cutter band having continuous saw teeth on one edge and a continuous knife blade on the other edge, and means to carry meat or the like against either edge of the band.

3. In a device of the character described, a pair of band carrying wheels, an endless metallic cutter band having continuous saw teeth on one edge and a continuous knife blade on the other edge, a guide wheel bearing against the knife blade edge of the band, said wheel having a thin peripheral groove narrower than the thickness of the band in which the knife edge partially enters without the edge striking the bottom of the groove, and means to carry meat or the like against either edge of the band.

4. In a device of the character described, a pair of band carrying wheels, an endless metallic cutter band having continuous saw teeth on one edge and a continuous knife blade on the other edge, cleaners for the band embodying curved spring metal members resiliently bearing with their edges against the opposite faces of the band at an angle oblique to the length of the band, and means to carry meat or the like against either edge of the band.

5. In a device of the character described, a pair of band carrying wheels, an endless metallic cutter band having continuous saw teeth on one edge and a continuous knife blade on the outer edge, a guide wheel bearing against the knife blade edge of the band, said wheel having a thin peripheral groove narrower than the thickness of the band in which the knife edge partially enters without the edge striking the bottom of the groove, cleaners for the band embodying curved spring metal members resiliently bearing with their edges against the opposite faces of the band at an angle oblique to the length of the band, and means to carry meat or the like against either edge of the band.

6. In a device of the character described, a frame, a lower band driving wheel mounted in a bearing thereon, an upper band wheel mounted in an upper bearing on the frame, said upper bearing being movable to adjust the distance between the wheels and to adjust the plane of the upper band wheel, both said wheels having crowned peripheries, a continuous metallic cutter band on said wheels having a continuous knife blade on one edge and continuous saw teeth on the other edge, and means to carry meat or the like against either edge of the cutter band.

7. In a device of the character described, a frame, a lower band driving wheel mounted in a bearing thereon, an upper band wheel mounted in an upper bearing on the frame, said upper bearing being movable to adjust the distance between the wheels and to adjust the plane of the upper band wheel, both said wheels having crowned peripheries, a continuous metallic cutter band on said wheels having a continuous knife blade on one edge and continuous saw teeth on the other edge, a guide wheel bearing against the knife blade edge of the band, said wheel having a thin peripheral groove narrower than the thickness of the band in which the knife edge partially enters without the edge striking the bottom of the groove, cleaners for the band embodying curved spring metal members resiliently bearing with their edges against the opposite faces of the band at an angle oblique to the length of the band, and means to carry meat or the like against either edge of the cutter band.

8. In a device of the character described, a frame, a lower band driving wheel mounted in a bearing thereon, an upper band wheel mounted in an upper bearing on the frame, said upper bearing being movable to adjust the distance between the wheels and to adjust the plane of the upper band wheel, both said wheels having crowned perpheries, a continuous metallic cutter band on said wheels having a continuous knife blade on one edge and continuous saw teeth on the other edge, a guide wheel bearing against the knife blade edge of the band, said wheel having a thin peripheral groove narrower than the thickness of the band in which the knife edge partially enters without the edge striking the bottom of the groove, cleaners for the band embodying curved spring metal members resiliently bearing with their edges against the opposite faces of the band at an angle oblique to the length of the band, and means to carry meat or the like against either edge of the band, said means embodying a meat carrying table reversibly movable in horizontal directions in the plane of the cutter band, said table having transverse ribs to prevent movement of the meat thereon.

9. A guide for a knife edge band, embodying a guide wheel having a narrow peripheral groove of width less than the thickness of the band, the knife edge of the band entering partially into the groove in the manner described.

10. Cleaners for a cutting band, embodying curved cleaner blades stationarily secured at one end at opposite sides of the blade and extending along the blade in the direction of its travel and then extending curvedly inwardly and diagonally back along the blade, the ends of the blades pressing resiliently oppositely against the band.

11. Cleaners for a cutting band, embodying curved cleaner blades stationarily secured at one end at opposite sides of the blade and extending along the blade in the direction of its travel and then extending curvedly inwardly and diagonally back along the blade, the ends of the blades pressing resiliently oppositely against the band, and the band engaging ends of the blades terminating and bearing on the band on lines diagonal to the travel of the band.

In witness that we claim the foregoing we have hereunto subscribed our names this 3rd day of May, 1917.

WILSON R. WOODS.
JAMES F. LANGSTON.